(12) United States Patent
Locke

(10) Patent No.: US 8,652,392 B1
(45) Date of Patent: Feb. 18, 2014

(54) METHOD OF FORMING CONCRETE

(76) Inventors: Reginald Locke, San Francisco, CA (US); Paulette Locke, legal representative, San Francisco, CA (US)

( * ) Notice: Subject to any disclaimer, the term of this patent is extended or adjusted under 35 U.S.C. 154(b) by 1019 days.

(21) Appl. No.: 12/256,366

(22) Filed: Oct. 22, 2008

Related U.S. Application Data

(60) Provisional application No. 61/000,049, filed on Oct. 22, 2007.

(51) Int. Cl.
*C04B 7/00* (2006.01)

(52) U.S. Cl.
USPC .......................................................... 264/426

(58) Field of Classification Search
USPC ............................................. 366/6; 264/426
See application file for complete search history.

(56) References Cited

U.S. PATENT DOCUMENTS

| | | | |
|---|---|---|---|
| 2,311,358 | A | 2/1943 | Bailey |
| 3,655,847 | A | 4/1972 | Morgan |
| 2002/0029724 | A1* | 3/2002 | Mott ................................ 106/35 |
| 2002/0033119 | A1* | 3/2002 | Styron ........................... 106/705 |
| 2005/0235875 | A1* | 10/2005 | Dinakis .......................... 106/499 |

OTHER PUBLICATIONS

Internet Archive file of Wikipedia Article on Cement. http://web.archive.org/web/20061021225426/http://en.wikipedia.org/wiki/Cement Archived Oct. 21, 2006.*

* cited by examiner

*Primary Examiner* — Yogendra Gupta
*Assistant Examiner* — Robert J Grun
(74) *Attorney, Agent, or Firm* — Knobbe, Martens, Olson & Bear LLP

(57) ABSTRACT

A method and apparatus are provided for forming concrete. In some embodiments the method includes conveying water vapor through cement powder. The cement powder can be hydrated such that a crystalline structure is formed. The concrete formed by the methods disclosed herein can possess advantageous physical properties such as increased strength, hardness, lower cost, lower processing times, etc.

20 Claims, 3 Drawing Sheets

METHOD OF FORMING CONCRETE

REFERENCE TO RELATED APPLICATIONS

The present application claims priority to U.S. Provisional Application No. 61/000,049 filed Oct. 22, 2007, which is incorporated by reference herein.

BACKGROUND OF THE INVENTION

1. Field of the Invention

This application relates to methods for forming concrete in general, and specifically an improved method for forming concrete.

2. Description of the Related Art

Concrete is typically made from cement powder, other cementitious material such as fly ash, and aggregate particles of various sizes including sand and gravel. Cementitious materials are typically mixed together with water to achieve a pourable viscous liquid. This liquid is then poured into a mold. Typically, the mold is vibrated to facilitate filling and settling of the wet mixture in the mold. The water hydrates the cement particles, initiating a chemical reaction. The concrete hardens as a result of the chemical reaction.

Cement powder typically contains calcium oxide (CaO), silicon oxide ($SiO_2$), aluminum oxide ($Al_2O_3$) and other compounds that react with water to form hydrated compounds or hydrates. The formation of the hydrates results in a stiffening of the mixture, which continues until the concrete fully hardens. The hardening process also results in the formation of a lattice or crystalline type structure.

Cement is also commonly combined with aggregates such as sand and gravel to form a durable and hard mixture. The cement powder incorporates the hard aggregate particles into the lattice, forming a strong and rigid structure. The usage of aggregates decreases the amount of cement powder required and strengthens the finished concrete product.

DETAILED DESCRIPTION OF THE PREFERRED EMBODIMENT

Cement is typically mixed with water and poured into a mold as a viscous liquid. The settling and curing processes are then facilitated using vibration and other methods. Unfortunately, the mixture often includes more water than is necessary for complete hydration of the cement. The excess water in conventional methods can result in a greater amount of void space or empty space, which refers to the absence of cementitious particles or aggregates and does not preclude the presence of water in the hardened concrete lattice. Excess water facilitates pouring the wet concrete mixture, but this causes the mixture in the mold to slump or flow due to gravity. Slump is related to the viscosity and workability of the mixture and is measured by placing an inverted cone filled with a wet cement mixture on a surface and removing the mold. The slump is the measure of the decrease in the height of the cone after the cement settles from the force of gravity.

Figure 1:
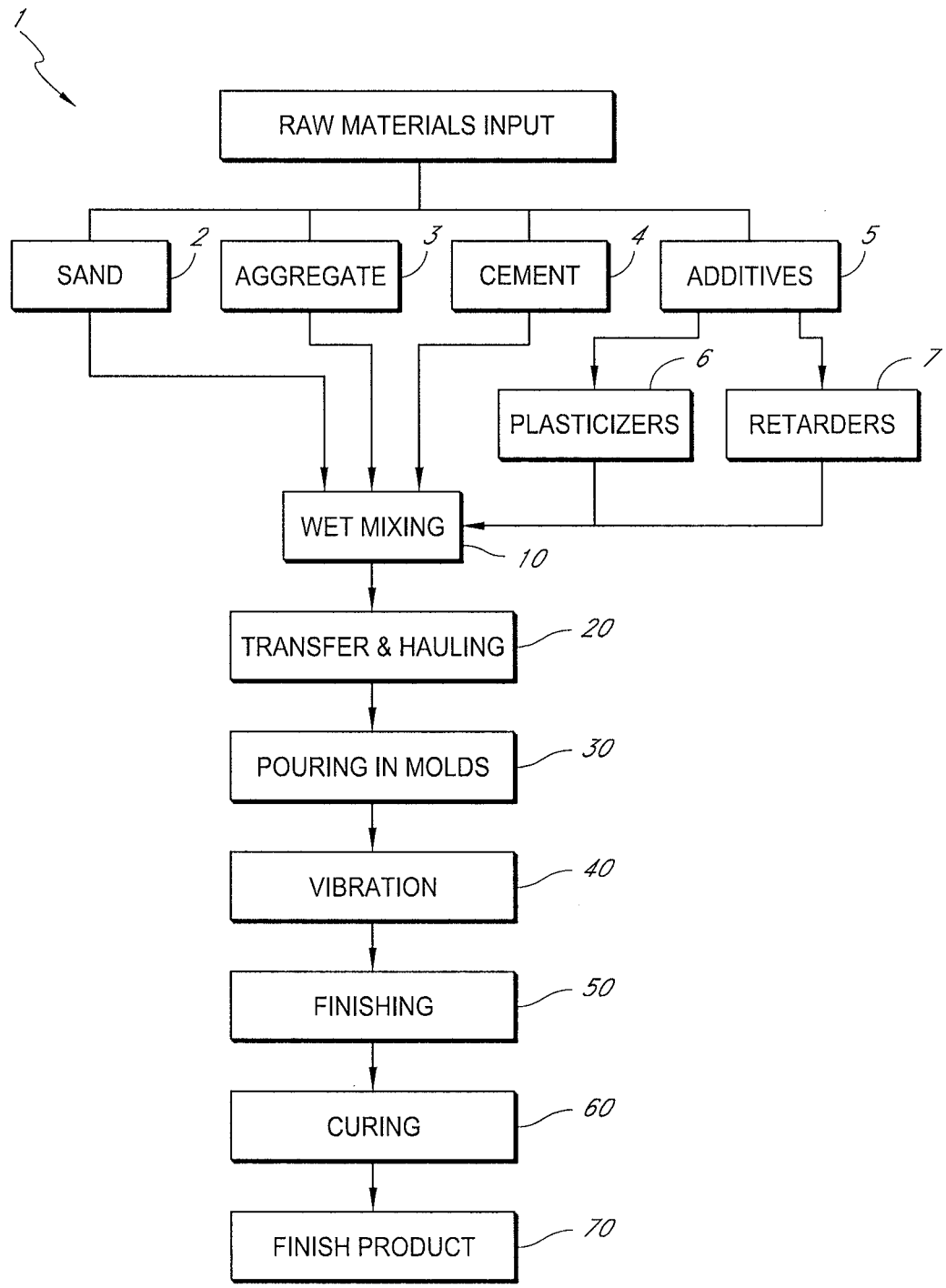
FIG. 1 is a flow chart detailing some steps of conventional pre-cast concrete fabrication.

FIG. 1 shows a flow diagram detailing a conventional method for manufacturing concrete. Typical raw materials used in cement include: sand 2, aggregates 3, cement 4, water, and additives 5. Additives can include plasticizers 6 that increase the fluidity of the mixture and retarders 7 that slow the hardening process. The raw materials are mixed together in a wet mixing step 10. The next step involves moving the wet mixture to the worksite via a transfer and hauling step 20. The wet mixture is then poured 30 into the mold. The pouring step 30 is followed by vibrating the mold. The vibration step 40 helps settle the wet concrete mixture in the mold as well as assist the curing process. Next, the cement undergoes a finishing step 50 to prepare the mixture for curing, which generally includes tamping the top of the mold to make it flat and level. After the finishing step 50 the concrete continues to harden and cure in a final curing step 60. Curing is the process of keeping the wet mixture under constant conditions until the hydration process is fairly complete. After the curing process is complete, the concrete is ready to be used as a rigid finished product 70.

Introducing liquid water to a dry cement mixture in the mold creates numerous problems. The movement and capillary action of the liquid water can disrupt the distribution of the aggregates. Increased voids and uneven curing can also result, likely because of capillary action and channeling of the liquid water.

Herein-disclosed embodiments solve these problems through introduction of water in a vapor form. The cement particles occupy the spaces between the aggregates and are hydrated as the water vapor diffuses through the mixture until full hydration occurs. The water vapor does not disrupt the location and distribution of the well mixed aggregates. The water vapor does not create the capillary channeling problems created by the introduction of liquid water.

Figure 2:
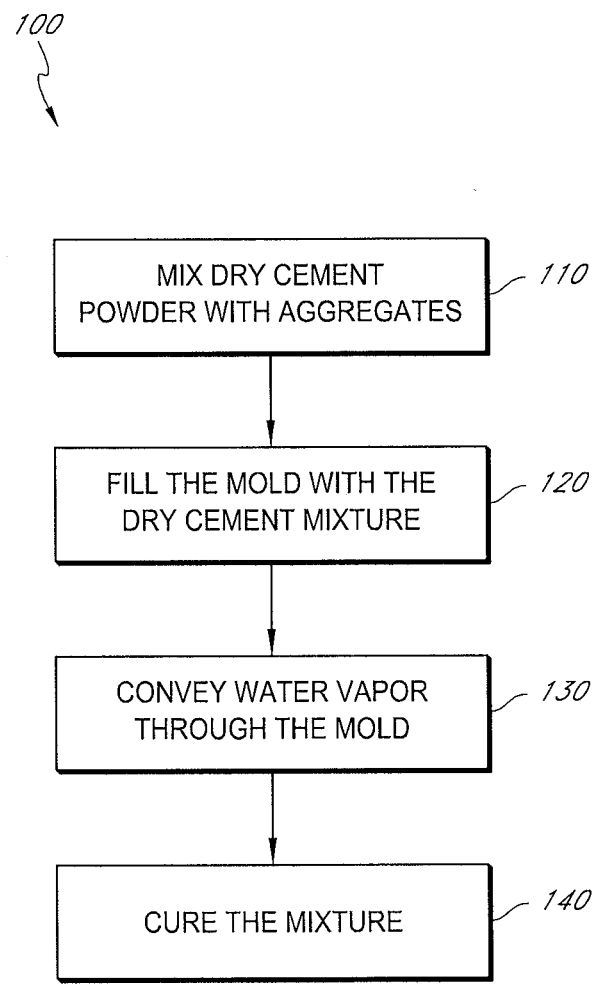
FIG. 2 is a flow chart illustrating an embodiment of a method for producing concrete.

FIG. 2 is a flow diagram illustrating a method 100 of manufacturing concrete, according to one embodiment. The raw materials are mixed together 110 as dry ingredients. Uniform mixing of the dry materials is preferred and can occur with the aid of mechanical devices such as a vibrating tumbler, a mixing gun, ultrasonic sound waves, etc. Static electricity can build up during mixing when using the tumbler, which can inhibit achieving a uniform mix of all of the different sized particles. It is beneficial to ground the dry tumbling mixture by grounding the tumbler and/or adding iron filings, which can decrease static buildup in the mixture. Achieving a uniform mix is preferred because it helps ensure a consistent product with specific physical properties. It is desirable to minimize space between aggregates, by filling them with smaller cementitious particles, such as cement powder or a mixture of cement powder and fly ash, which form a crystalline structure after curing.

The dry mixture is poured 120 into the mold after it is relatively uniformly mixed. The mold is closed and an applied differential pressure causes the water vapor to move through the dry mixture. The differential pressure can be generated by a downstream vacuum source or by an upstream pressurizer. For example a downstream vacuum pump or an upstream pressurizing pump can be provided. The water vapor hydrates the dry cement powder. The hydrated cement products then begin to form a crystalline structure. The temperature of the cement mixture can increase during curing because of the exothermic nature of hydration of the dry cement powder, in which heat is released. The flow rate of water vapor through the dry mixture can be adjusted by varying the applied pressure differential across the cement mixture, in order to control the process temperature of the concrete. After some curing, the cement is hard enough to be removed from the mold, after which additional curing 140 can occur. The final stages of curing can be performed in a humid chamber to keep the concrete at a constant temperature and ensure uniform and consistent drying. The concrete is ready as a finished product after the curing process 140 is complete.

The mold is designed so that the water is introduced in a vaporous state. This is achieved through differential pressure. As the water molecules migrate through the agglomeration, they progressively hydrate the cementitious materials and remove or scrub off the products of hydration (i.e., a gel for Portland Cement) from the surfaces of the cement particles, so that the unhdryated portions of the particles are newly exposed to the supply of "clean" water, which is necessary for continued hydration.

As the water vapor migrates through the emerging agglomeration the movement of the cementitious gel fills any remaining open spaces between larger aggregates until gaseous diffusion is substantially lessened and the products of hydration stiffen into their crystalline structure. The migration of water vapor increases the contact between cement particles and aggregate particles, decreasing empty spaces and strengthening the crystalline lattice structure. The flow of water vapor can be stopped after the cement particles are substantially hydrated and the lattice structure is substantially formed.

The cement powder can also contain various concentrations of aggregates. Aggregates may include, without limitation, one or more of: sand, gravel, fly ash, lime, rocks, treated polystyrene balls (dry-cement coated, graphite-coated, etc.), low density clay balls, plastic pellets, etc. Fly ash is a combustion product from the coal burning process, which can be mixed with dry cement powder to decrease the overall usage of cement powder and thereby reduce the cost, because cement is more expensive than fly ash. In one embodiment, a method for forming concrete can utilize up to about 40-50% fly ash as a percentage of the combined dry weight of fly ash and dry cement powder. Sand and gap-graded aggregates can be of various sizes ranging from as large as ¾" diameter to as small as 300 mesh (300 mesh corresponds to ⅟₃₀₀" diameter), preferably with aggregate sizes from 10 mesh to 300 mesh. A preferred mixture of aggregates includes: 10 mesh, 20 mesh, 60 mesh, 90 mesh, and 300 mesh particle sizes.

It will be understood that the sizes of the aggregates affects the required mixing time of the dry cement mixture, and that using larger aggregates shortens the dry mixing time. However, using too many large aggregates can result in an increase in the voids or empty spaces of the finished product. Therefore, smaller aggregates are preferably used in conjunction with the larger aggregates to decrease empty spaces in the finished product.

The aggregates can also be chemically treated, such as polystyrene balls with dry cement coating or other coatings to facilitate mixing and reducing coagulation in the mixture. Porous aggregates can also be used, such as Bay Por™. Light fraction can be used to coat some of the aggregates. Light fraction is a liquid waste produced from the distillation of tar. Light fraction does not harden or evaporate at ambient temperatures and pressures.

The cement mixture can also contain other dry materials for tensile reinforcement. These materials can include polymer powders that can link together to supply tensile reinforcement. This reinforcement can also be enhanced by the addition of materials including but not limited to: microfibers, iron filings, metals, metal rods, and fiberglass. The iron filings can be soaked in or treated with nitric acid to: oxidize the iron surface to prevent corrosion, increase strength, and prevent static discharge from the iron filings during dry mixing.

Figure 3:
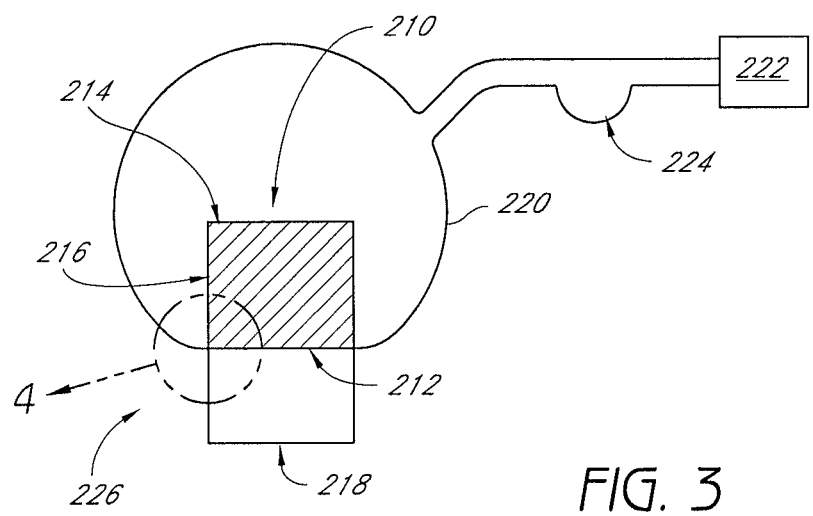
FIG. 3 is a cross sectional view of a mold that can be used according to one embodiment of the invention.

FIG. 3 illustrates a cross sectional view of a mold 210 in accordance with one embodiment. The mold 210 has a first side 212 and a second side 214. The mold can be made of any rigid material that can be perforated to allow the passage of water, including but not limited to: metals, plastic, fiberglass, and acrylic. The dry cement powder and any other additions are contained in an internal chamber of the mold 216. A reservoir 218 is located proximate the first side of the mold 212. The reservoir 218 contains liquid water and water vapor. A vacuum housing 220 surrounds a side of the mold 210. When a vacuum pump 222 is operating, the interior of the housing 220 is held at a lower pressure than the pressure in the water reservoir 218. The lower pressure in the vacuum housing 220 draws water vapor through the dry cement powder, causing the cement powder to form hydrates and eventually form a crystalline structure. The water is supplied from the reservoir 218. Water is drawn from the substance in the mold and is pulled through the vacuum line and condensed and collected in a catch pot 224. The amount of water collected in the catch pot 224 can be measured and monitored to determine the progress of the cure in the mold.

While FIG. 3 shows a vacuum pump 222 and a vacuum housing 220, an alternative embodiment employs a pump upstream of the mold. The upstream pump blows water vapor from the water reservoir into and through the mold.

Figure 4:
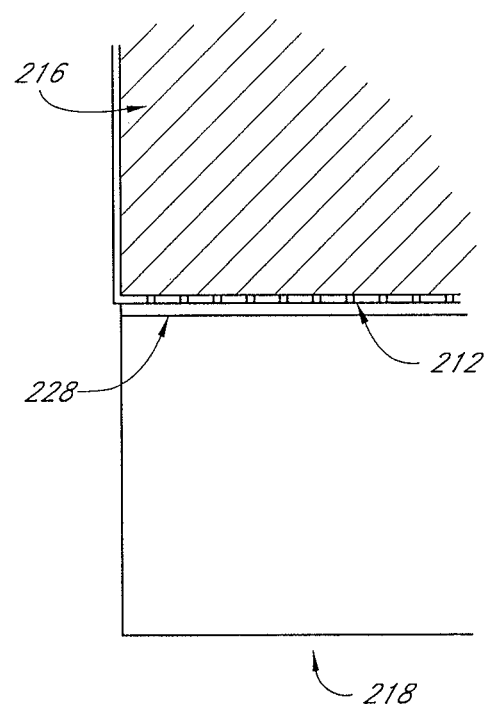
FIG. 4 is a close up of one area of the cross section illustrated in FIG. 3.

FIG. 4 is a close up of a portion 226 of FIG. 3, in accordance with an embodiment. The first side 212 is separated from the reservoir 218 by a semi-permeable membrane 228. The water vapor in the reservoir 218 is drawn through the semi-permeable membrane 228, the perforations in the first side 212 of the mold 210, and the cement powder 216 before exiting the second side 214 of the mold 210 into the vacuum housing 220. The water reservoir 218 can also be heated to increase the vapor pressure of the water. The semi-permeable membrane 228 preferably allows passage of water but not cement powder or cement material. As a result, the first side 212 of mold 210 allows passage of water but not cement powder or cement material.

In another embodiment, a semi-permeable membrane is not used, and the first side 212 is perforated with holes of a size and character such that vapor and liquid water can pass through but not cement particles or aggregates.

In another embodiment, all of the surfaces of the mold 210 are perforated to allow gaseous and liquid water to enter or exit the internal volume of the mold 216, while preferably preventing the passage of cement particles or aggregates therethrough.

In other embodiments, the first side 212 of the mold 210 and the second side 214 of the mold can be configured in shapes besides the rectangular shape illustrated in FIG. 3, such as a "U" shape. It will be appreciated that a wide variety of mold shapes are possible, depending upon the desired configurations of the finished concrete products. Also, some surfaces of the mold can be non-permeable while other surfaces of the mold are permeable with respect to water molecules but not cement particles.

Concrete made according to embodiments of the invention offers many advantages over conventional concrete products. The intimate contact between the various aggregate particles causes physical characteristics in the final product that are more closely aligned to natural stone than concrete. The compressive and tensile (shearing) strength values are increased, allowing less concrete to achieve equal strength results, along with a reduction in need for reinforcement via steel, fiberglass, or other suitable materials. In addition, a smaller percentage of cement powder is required in the cement mixture to achieve desired physical strength properties, thereby reducing cost. This is because the density of the concrete formed by the methods disclosed herein is greater than conventional concrete, enabling cost savings by increasing the amount of less costly cement substitutes in the cement mixture, such as fly ash. Also, as is typical with granite, limestone, and sandstone, concrete manufactured according to embodiments of the invention are more impervious to intrusion of moisture. For example, naturally occurring granite typically absorbs water at less than 0.5% by weight, with most compositions absorbing less than 0.30% by weight. Other compositions of granite can absorb water at less than 0.15% by weight or sometimes less than 0.10% by weight.

Fly ash can be used in a greater amount than conventional concrete. For example, the dry cement mixture can have a weight percentage of fly ash up to about 50%, such as, 30-50%, 40-50%, or 45-50%. The increased usage of fly ash without detriment in the final product allows for a cost saving due to reduced consumption of cement powder. The crush strength test results of the concrete with a greater amount of fly ash are also similar to that of conventional concrete.

Manufacturing methods for prefabricated parts according to embodiments of the invention are several times faster than conventional techniques. This is because the concrete piece can be removed from the mold after a shorter curing period, freeing up the mold to process the next part. Molds can be utilized to form the parts, and removed upon complete hydration of the cement within the agglomeration. After hydration, the entire mass is relatively stable, due to the contact between the aggregate particles, in contrast to the slumping exhibited by a conventional concrete mix after a similar curing period in a mold.

Embodiments of these methods for making concrete are especially applicable in the field of pre-cast concrete fabrication. Compared to products made by conventional methods, products in accordance with the methods disclosed herein are improved in many respects, such as: dimensional stability, porosity, and compressive and tensile strengths. Furthermore, more complex shapes can be produced with less cement and reinforcing steel at a faster rate than is now possible.

In some embodiments, the density of concrete made according to these methods can approach that found in sedimentary rock (around 4-8% higher than conventional concrete). In other embodiments, the concrete can be made light enough to float, through the addition of low density aggregates. Concrete produced by embodiments of the invention can also be more water-resistant. This resistance is due to the enhanced density in the end product and a more uniform distribution of cement hydration products throughout the cured product.

Concrete made according to embodiments of the invention offers additional advantages over conventional concrete products. Concrete made according to embodiments of the invention produces a greater amount of gel than that made by conventional methods (for an equivalent amount of cement). The introduction of water vapor, instead of liquid, increases the portion of the cement mixture that becomes too exposed to the water. This results in more efficient hydration of the cement, as well as increased gel formation because a greater percentage of cement forms cement hydrates (gel). Also, less water is used in these methods then in conventional wet mixing. This is because the water molecules are provided somewhat gradually, as opposed to all at once as in conventional methods. The more gradual provision of water makes it possible to avoid providing too much water. The greater excess water used in conventional methods is not used in forming the crystalline concrete structure. The excess free water in conventional methods takes a longer time to diffuse through the developing lattice as the cement dries. The diffusion of excess water produces larger capillary channels, which can result in a greater amount of void spaces. In contrast, methods of the present invention form additional cement hydration products, resulting in a more complete hydration of the cement mixture. In some embodiments, the concrete is about 5% more hydrated than conventional concrete. The decrease in free water retention also reduces corrosion of metals added for reinforcement. The increased hydration of the cement powder results in a much harder cured product, which demonstrates a higher Mohs scratch test hardness than typical concrete. The Mohs scratch test hardness can be as high as that of silicon glass.

Processing times are significantly less than conventional concrete curing methods because no vibration is required when filling the mold and more efficient introduction of water promotes lattice formation and rigidity without long curing and drying times. In short, the minimization of excess water reduces drying times. The cement produced according to the presently disclosed methods can be removed from the mold after as little as one hour in the mold. All of these results can be achieved without the need for vibrating the mixture in the cement mold.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while one variation of the invention has been shown and described in detail, other modifications, which are within the scope of this invention, will be readily apparent to those of skill in the art based upon this disclosure. It is also contemplated that various combinations or sub-combinations of the specific features and aspects of the embodiment may be made and still fall within the scope of the invention. Thus, it is intended that the scope of the present invention herein disclosed should not be limited by the particular disclosed embodiment described above, but should be determined only by a fair reading of the claims that follow.

What is claimed is:

1. A method for forming concrete comprising:
   pouring a dry cement powder into a mold; and
   without mixing the dry cement powder with liquid water, conveying water vapor through said dry cement powder;
   wherein said water vapor hydrates said cement powder, creating a crystalline structure, and
   wherein:
      the mold has one or more surfaces that are permeable with respect to gaseous water but not with respect to cement particles;
      the method further comprises providing a reservoir of water on a side of the mold; and
      said conveying water vapor comprises operating a pump to effect a flow of water vapor from the reservoir through the mold.

2. The method of claim 1, further comprising providing a permeable membrane between the mold and the reservoir, the membrane being permeable with respect to gaseous water but not with respect to cement particles, said conveying water vapor comprising causing the water vapor to flow through the membrane.

3. The method of claim 1, wherein the pump is a vacuum pump.

4. The method of claim 3, further comprising positioning the vacuum pump and the reservoir on opposing sides of the mold.

5. The method of claim 1, further comprising positioning the reservoir adjacent to the mold.

6. The method of claim 1, wherein providing the dry cement powder comprises providing a mixture of dry cement powder and aggregates.

7. The method of claim 1, wherein conveying water vapor through said cement powder comprises drawing said vapor through said cement powder with a vacuum source.

8. The method of claim 6, wherein providing the mixture comprises using cement coated polystyrene balls as an aggregate.

9. The method of claim 6, wherein providing the mixture comprises using sand as an aggregate.

10. The method of claim 6, wherein providing the mixture comprises using rocks or gravel as an aggregate.

11. The method of claim 6, wherein providing the mixture comprises using lime as an aggregate.

12. The method of claim 6, wherein providing the mixture of dry cement powder and aggregates comprises providing aggregates coated with light fraction.

13. The method of claim 1, wherein providing dry cement powder comprises providing a mixture of dry cement powder and a material for tensile reinforcement.

14. The method of claim 13, wherein providing the mixture comprises using iron filings or metal powders as the material for tensile reinforcement.

15. The method of claim 13, wherein providing the mixture comprises using microfibers, polymer powders, or fiberglass as the material for tensile reinforcement.

16. The method of claim 13, wherein providing the mixture comprises using metal rods as the material for tensile reinforcement.

17. The method of claim 1, wherein providing dry cement powder includes providing dry Pozzolan-lime cement powder.

18. The method of claim 1, wherein providing dry cement powder includes providing Portland Cement powder.

19. The method of claim 1, wherein providing dry cement powder includes providing a mixture of cement powder and fly ash.

20. The method of claim 19, wherein the mixture of cement powder and fly ash includes 40-50% fly ash by weight.

* * * * *